(12) United States Patent
Zoppas et al.

(10) Patent No.: US 8,915,729 B2
(45) Date of Patent: Dec. 23, 2014

(54) BLOW MOULD

(75) Inventors: Matteo Zoppas, Conegliano (IT); Ernesto Eusebione, Mareno di Piave (IT); Franco Cavallini, Treviso (IT); Massimiliano Fornasier, Refrontolo (IT)

(73) Assignee: S.I.P.A. Societa' Industrializzazione Progettazione E Automazione S.p.A., Vittorio Veneto (IT)

( * ) Notice: Subject to any disclaimer, the term of this patent is extended or adjusted under 35 U.S.C. 154(b) by 0 days.

(21) Appl. No.: 14/005,485

(22) PCT Filed: Mar. 16, 2012

(86) PCT No.: PCT/EP2012/054649
§ 371 (c)(1),
(2), (4) Date: Sep. 16, 2013

(87) PCT Pub. No.: WO2012/123567
PCT Pub. Date: Sep. 20, 2012

(65) Prior Publication Data
US 2014/0010910 A1 Jan. 9, 2014

(30) Foreign Application Priority Data
Mar. 16, 2011 (IT) .............................. RM2011A0126

(51) Int. Cl.
*B29C 33/30* (2006.01)
*B29C 49/30* (2006.01)
*B29C 49/48* (2006.01)
*B29C 49/06* (2006.01)

(52) U.S. Cl.
CPC ......... *B29C 49/30* (2013.01); *B29C 2049/4856* (2013.01); *B29C 49/48* (2013.01); *B29C 49/06* (2013.01); *B29C 49/4823* (2013.01); *B29C 33/306* (2013.01); *B29C 2049/4864* (2013.01)
USPC ............ 425/182; 425/522; 425/525; 425/541

(58) Field of Classification Search
CPC .................. B29C 33/306; B29C 49/30; B29C 2049/4858; B29C 2049/4892
USPC .................................. 425/182, 522, 525, 541
See application file for complete search history.

(56) References Cited

U.S. PATENT DOCUMENTS

| | | | |
|---|---|---|---|
| 7,014,446 B2 * | 3/2006 | Hall | 425/522 |
| 8,408,893 B2 * | 4/2013 | Stoiber et al. | 425/182 |
| 8,714,957 B2 * | 5/2014 | Blochmann et al. | 425/182 |
| 2010/0278961 A1 | 11/2010 | Clark | |
| 2011/0056628 A1 | 3/2011 | Ruf et al. | |

FOREIGN PATENT DOCUMENTS

CN 201 165 036 Y 12/2008

* cited by examiner

*Primary Examiner* — Robert B Davis
(74) *Attorney, Agent, or Firm* — Richard L. Sampson, Esq.

(57) ABSTRACT

A blow mould for containers wherein the mould base comprises a first member (5) and a second member (6) connectable to each other by means of a quick coupling system comprising at least one first connection pin, wherein said second member (6) includes a first slider (13), defining a first sliding direction on a plane orthogonal to the longitudinal axis of the mould and capable of taking an unlocking position and a locking position, said first slider (13) being provided with at least a hole in order to lock the first connection pin when the first slider (13) is in the locking position, and a second slider (16) defining a second sliding direction on said plane, intersecting said first direction; said second slider (16) being slidable along said second direction from a position of mechanical connection with the first slider (13) to a position of releasing from said first slider.

11 Claims, 10 Drawing Sheets

Fig. 7
SECTION D-D

BLOW MOULD

FIELD OF THE INVENTION

The present invention relates to a blow mould or stretch-blow mould of at least one preheated preform, made of thermoplastic material, for the production of containers.

STATE OF THE ART

Some types of blow mould for plastic containers comprise two lateral half-moulds, removably fixed to respective half-mould holders, and a mould base.

In an example of known embodiment, said mould base comprises a first member or bottom support, i.e. the support of the bottom impression of the container to be blown, usually screw-fixed to a second member, indicated as base plate or collector. Screw connections are further provided in order to connect ducts for a thermal conditioning liquid, for example water, provided in the collector to ducts provided within the bottom support.

In the event of changing the type of container to be blown in the mould, it is necessary to remove both the lateral half-moulds in order to be able to replace the half-impressions, and the mould base in order to be able to replace the bottom impression of the container.

A further example of a blow mould is described in the document US2004/0052892A1. This solution allows a quick replacement to be carried out thanks to a quick coupling system provided between bottom support and collector, but said system is, however, complex and also involves the obligation to use a cumbersome lever for the activation thereof.

The need is therefore felt to provide a blow mould provided with a quick coupling system in the area of the mould base which allows the aforementioned drawbacks to be overcome.

SUMMARY OF THE INVENTION

The primary object of the present invention is to provide a blow mould which allows simpler and quicker replacement of the bottom impression of the container to be blown.

A further object of the invention is to provide a blow mould in which it is no longer necessary to use external tools for disassembling and assembling the members constituting the mould base.

The present invention, therefore, proposes to achieve the objects discussed above by providing a blow mould for plastic containers, the mould defining a longitudinal axis, which in accordance with claim 1 comprises at least two lateral half-moulds and a mould base, wherein the mould base comprises a first member and a second member connectable to each other by means of a quick coupling system comprising at least one first connection pin between first member and second member, said first connection pin being fixed to said first member, wherein said second member includes therein
a first slider, defining a first longitudinal sliding direction, sliding along said first direction on an orthogonal plane with respect to said longitudinal axis and capable of taking an unlocking position and a locking position, said first slider being provided with at least one hole to lock said at least one first connection pin therein when the first slider is in the locking position,
and a second slider defining a second longitudinal sliding direction on said plane, intersecting said first sliding direction; said second slider being slidable along said second sliding direction from a first position of mechanical connection with the first slider, wherein the first slider is in the unlocking position, to a second position of releasing from said first slider, wherein the first member and the second member are connected to each other by means of said at least one first connection pin and the first slider is in the locking position.

The first member of the blow mould base is also called bottom support, i.e. it is the support of the bottom impression of the container to be blown.

The second member of the blow mould base, also called collector or base plate, is designed to connect the bottom support to a positioning device for positioning the mould base along the longitudinal axis of said mould.

In a preferred embodiment, the bottom support is provided with two first connection pins and the first slider in the collector is provided with two holes arranged along the first longitudinal sliding direction, each hole being appropriately shaped to lock a respective first connection pin when the first slider moves from the unlocking position between first member and second member to the locking position between first member and second member. The bottom support is also provided with a second connection pin, such as a tapered pin, adapted to interact with the second slider of the collector, taking it from said first position of mechanical connection with the first slider to said releasing position from the first slider.

In the collector, two internal housings are provided in which the first and the second sliders can slide, respectively, and in which, at an end thereof, respective elastic return means are fixed, which push the first slider towards said locking position and the second slider towards said first position of mechanical connection, respectively.

Between bottom support and collector, quick coupling, fluid-tight connections are further provided for passing a liquid for thermal conditioning, such as cooling or heating, from the collector to the bottom support and vice versa; said connections having a male element protruding from the bottom support and a female element engaged with the collector or vice versa. The possibility is not excluded of providing a single fluid-tight connection between bottom support and collector.

On the surface of the collector facing the bottom support, four appropriate through-holes are provided for passing the first connection pins into the internal housing in which the first slider slides and for passing the second connection pin into the internal housing in which the second slider slides, respectively.

The assembly of the bottom support on the collector, and therefore on the base of the blowing machine, takes place by simply applying a downward force on the bottom support. Following this force, the fluid-tight connections are connected, which have commercial type push-fit couplings, and the first slider is also released from the unlocking position to the locking position between bottom support and collector.

The removal of the bottom support from the collector takes place by pushing the first slider toward the inside of the collector and the connection pins uncouple due to the force of the springs, provided in the push-fit couplings of the fluid-tight connections, which separate the two parts.

In the preferred embodiment with two first connection pins, the quick mechanical coupling of the bottom support to the mould base plate takes place by means of engaging the two first connection pins in the respective holes or housings of the first slider during the passing thereof from the unlocking position to the locking position.

The first slider is arranged substantially diametrically in the body of the collector and is actuated in a radial direction towards the inside or towards the outside of the perimeter surface of the base. During the step of unlocking between bottom support and collector, the first slider is made to slide in the housing thereof by pushing axially by force of hand and is returned to position by return springs.

The invention allows to reduce the replacement times of the bottom impressions of the containers to be moulded to around 15 seconds, thus reducing the replacement time in a blowing machine with several blowing stations.

A further advantage of the present invention is represented by the fact that the removal and replacement of the members constituting the mould base can simply take place manually, without the need of providing the use of external tools.

Both hydraulic and mechanical coupling and uncoupling operations between the parts take place by means of a single respective manual operation. In fact, the solution of the invention allows the hydraulic connections to be engaged with a single manual movement of the bottom support and, at the same time and automatically, to carry out the mechanical locking between the bottom support and the collector.

The solution of the invention further allows the hydraulic connections to be released with a single manual movement of the first slider and at the same time to mechanically uncouple the bottom support from the collector. All of this clearly leads to greater speed and efficiency in operations of changing format of the bottom impression of the container to be moulded.

Another advantage is represented by the fact that the solution of the invention allows a reduction in the force needed to couple the two parts of the mould base. In fact, during the engaging step, with respect to state of the art solutions, practically no force is required to insert the first connection pins into the first slider, while the force needed to couple the male-female elements of the hydraulic connections remains unchanged, to which the insertion force for inserting the tapered pin into the second slider must be added.

The dependent claims describe preferred embodiments of the invention.

BRIEF DESCRIPTION OF THE FIGURES

Further features and advantages of the invention will become clearer in light of the detailed description of preferred but not exclusive embodiments of a blow mould, illustrated by way of non-limiting example with the aid of the attached drawings in which:

FIG. 1b represents a perspective view of components of the blow mould base in FIG. 1a;

FIG. 2c represents a top view of the components shown in FIG. 2a;

FIG. 5 represents a section view along the plane C-C of the mould base in FIG. 2a;

FIG. 6c represents a top view of the components shown in FIG. 6a;

FIG. 9 represents a section view along the plane F-F of the mould base in FIG. 6a;

The same reference numbers in the figures identify the same elements or components.

DETAILED DESCRIPTION OF PREFERRED EMBODIMENTS OF THE INVENTION

Figure 1A:
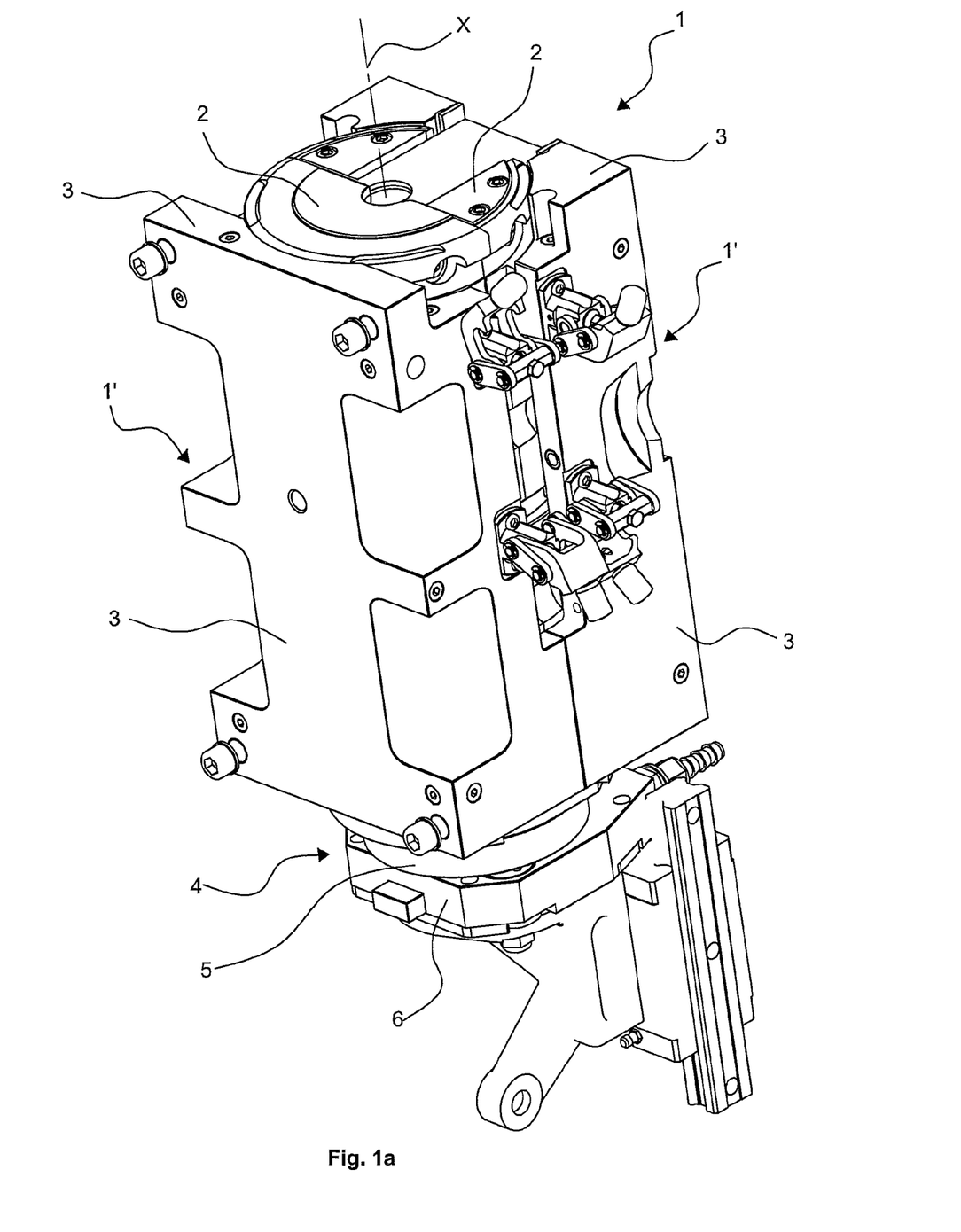
FIG. 1a represents a perspective view of a blow mould according to the invention.

With reference to FIG. 1a, a blow mould is represented, globally indicated with the reference number 1, for the production of containers, in particular bottles, made of thermoplastic material such as PET, PEN or other suitable material, or mixtures thereof, by means of the blow moulding or stretch-blow moulding of preheated preforms.

Figure 6A:
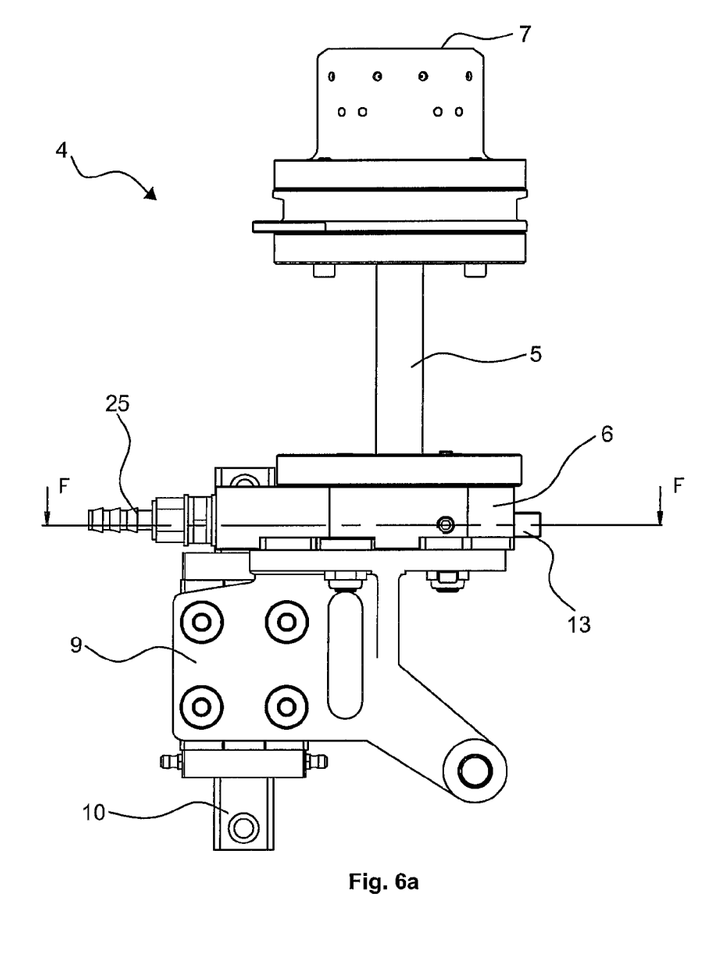
FIGS. 6a and 6b represent side views of the components of the mould base in FIG. 1, assembled to each other.
Figure 6B:
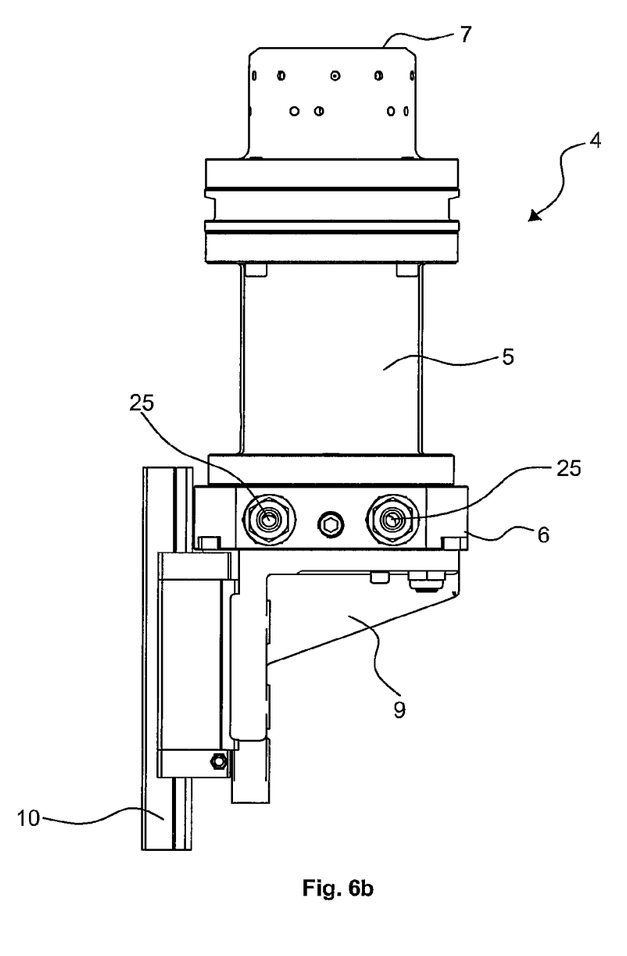
Figure 6C:
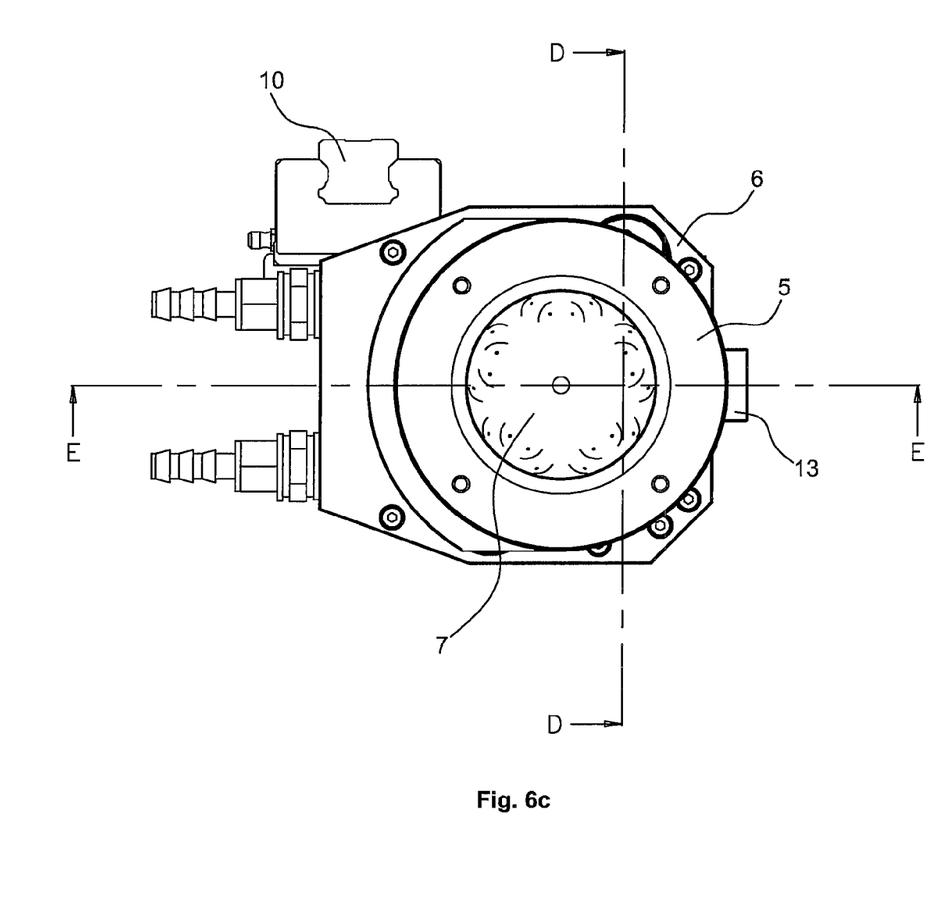

Blow mould 1, defining a longitudinal axis X, comprises:
two lateral half-elements 1', each lateral half-element 1' comprising a half-mould 2 supported by a half-mould holder 3. The two half-mould holders 3 are movable with respect to each other;
and a mould base 4, partially visible in FIG. 1a and wholly visible in the subsequent FIGS. 1b, 2 and 6.

The mould base 4 (FIG. 1b) comprises a first member 5 and a second member 6.

Figure 1B:
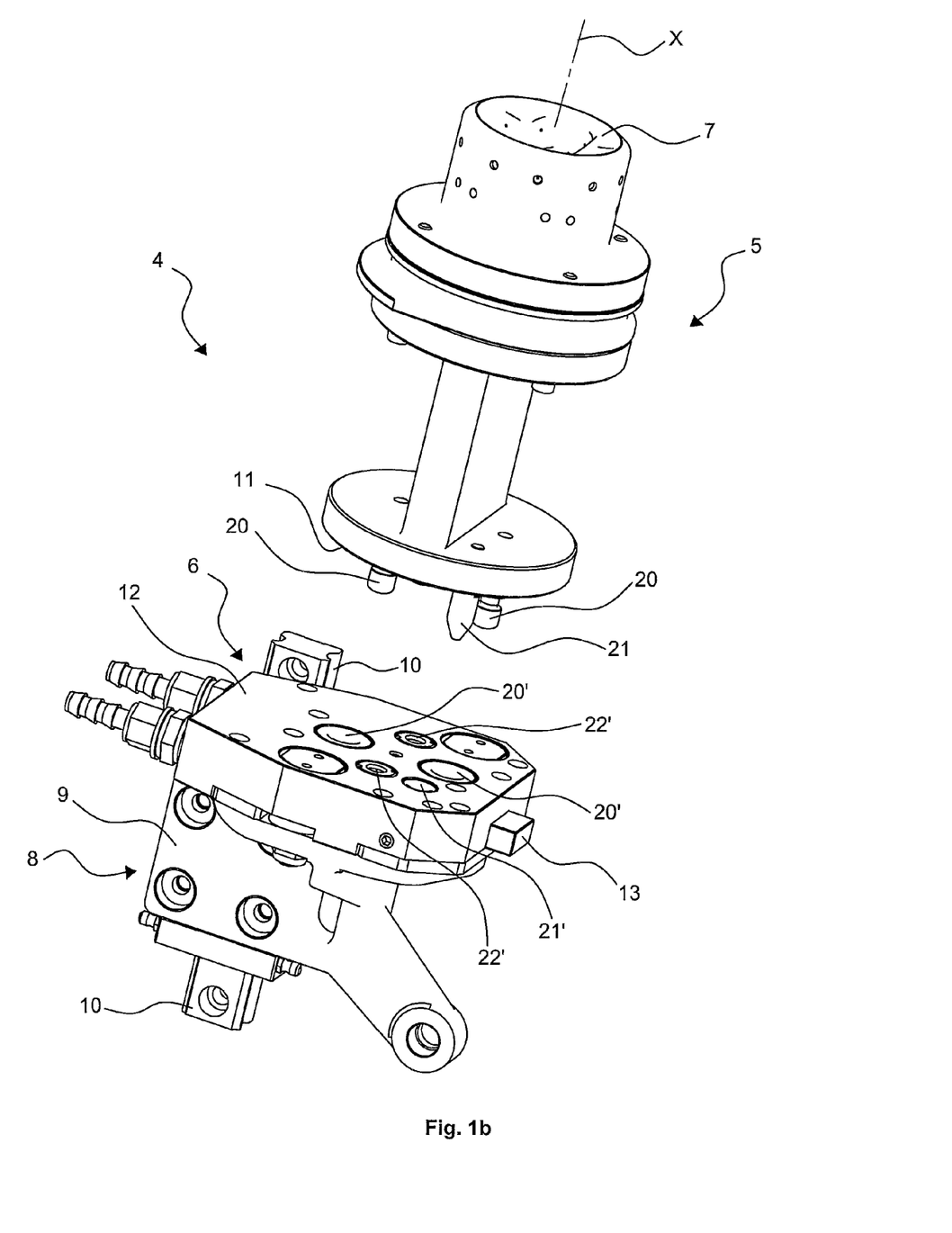
Figure 2A:
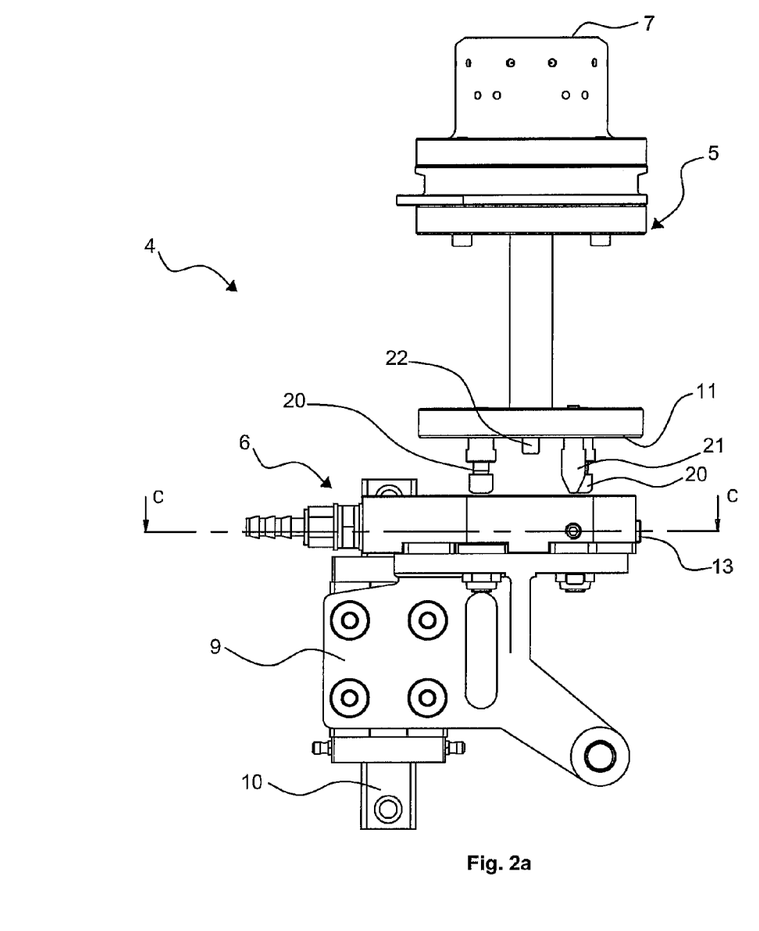
FIGS. 2a and 2b represent side views of the components of the mould base in FIG. 1, not assembled to each other.
Figure 2B:
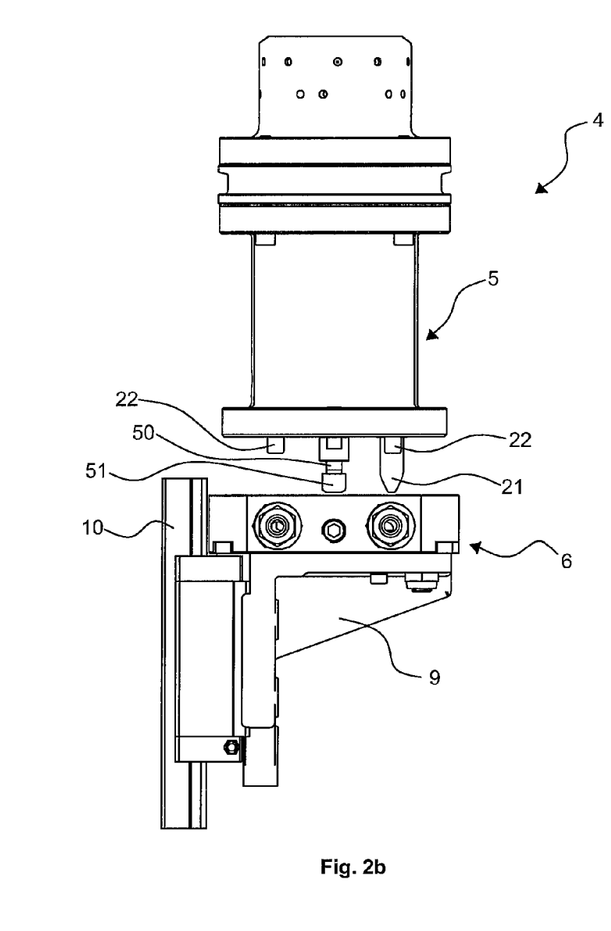
Figure 2C:
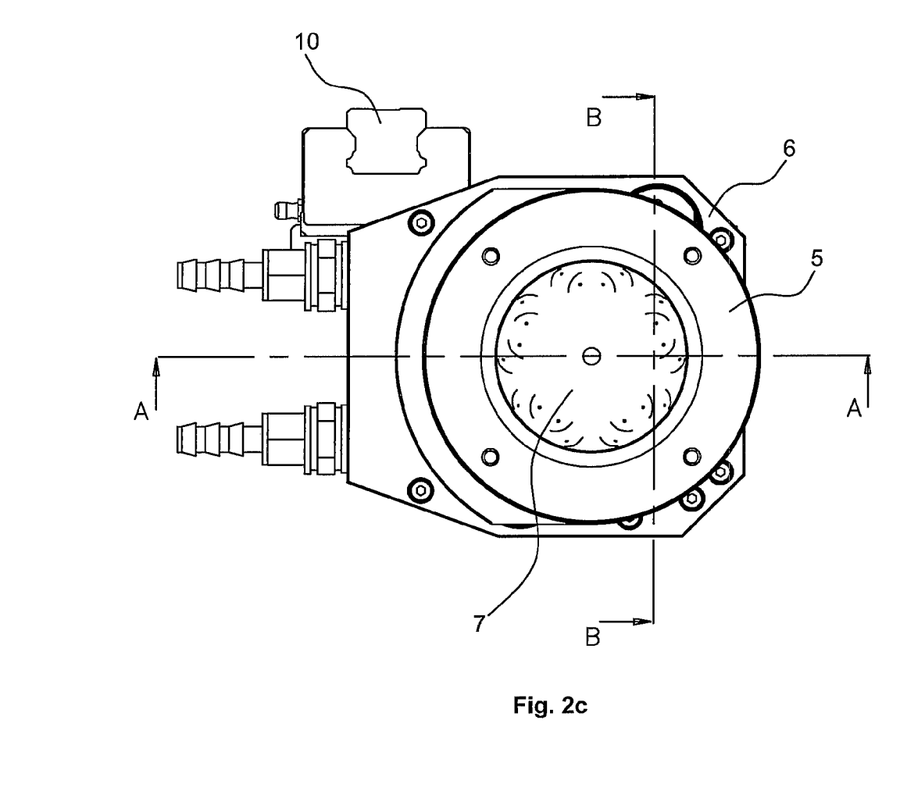
Figure 3:
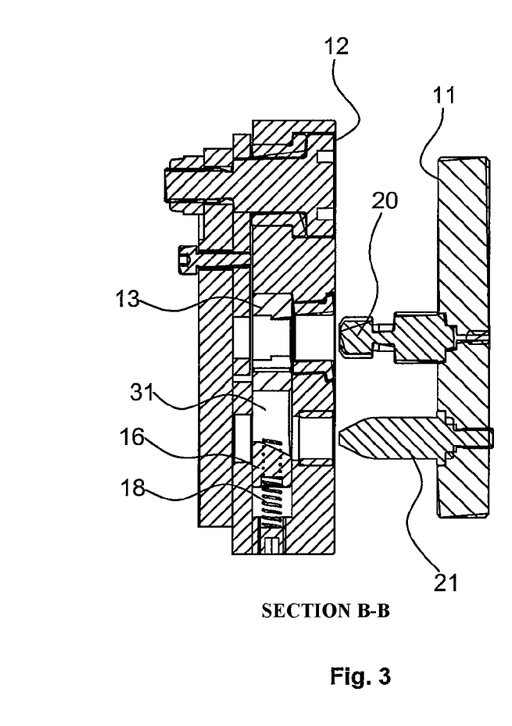
FIG. 3 represents a section view of part of the components in FIG. 2c along the plane B-B.
Figure 4:
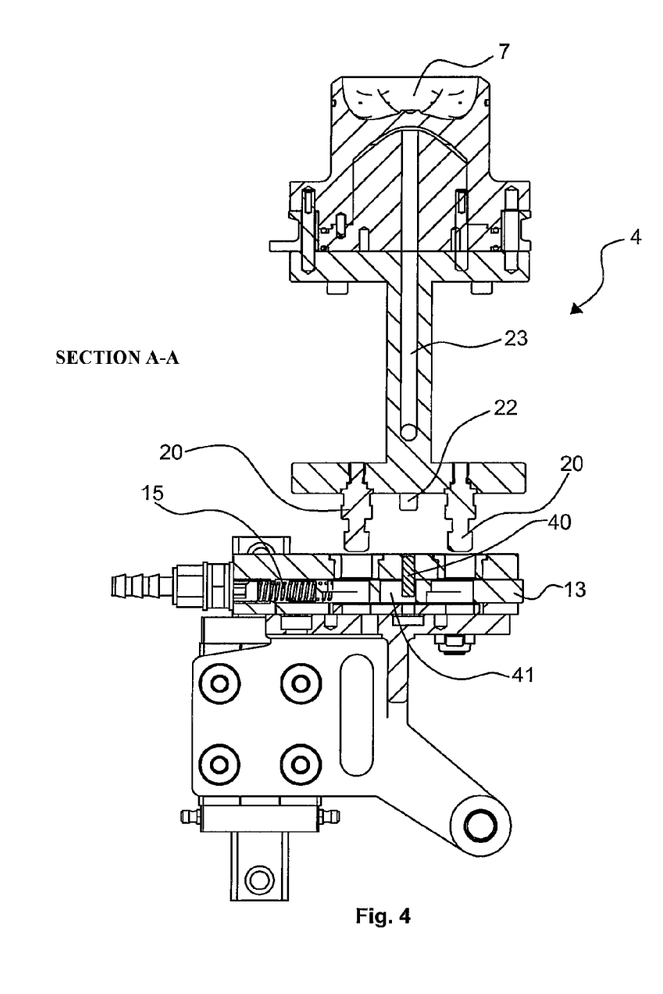
FIG. 4 represents a section view of the components in FIG. 2c along the plane A-A.

The first member 5 of blow mould base 4, which is also called bottom support, is the support member of the bottom impression 7 of the container to be blown. Said bottom impression 7 of the container and the lateral half-impressions (not shown), provided within the half-moulds 2, together define the impression or global figure of the container to be blown in the mould.

The second member 6 of blow mould base 4, also called collector or base plate, is designed to connect the bottom support or support member 5 to a positioning device 8 for positioning the mould base 4 along the longitudinal axis X of said mould. In the Figures, said positioning device 8 is represented by a carriage 9 which is movable along a track 10. The collector is made of a metal material, preferably but not necessarily aluminium.

With reference to the Figures from 2a to 12, a preferred embodiment of the mould of the invention is shown as follows.

The support member 5 is provided, at a first end, with a housing for the bottom impression 7 of the container to be blown and, at a second end, with a flat surface 11.

The support member 5 is further provided with the following components, protruding from said flat surface 11, which are useful for both the mechanical and hydraulic connection between said support member 5 and the collector 6:
two first mechanical connection pins 20,
a second mechanical connection pin 21,
two male elements 22 of respective push-fit, fluid-tight connections.

In a preferred variant, the second connection pin 21 is a tapered pin.

The collector or base plate 6 is provided, at a flat surface 12 thereof facing the flat surface 11 of the support member 5, with:

two first through-holes 20' for the passage of said first mechanical connection pins 20, a second through-hole 21' for the passage of said second mechanical connection pin 21, two female elements 22' of respective push-fit, fluid-tight connections, corresponding to the male elements 22 and engaged with the body of the collector 6.

Both support member 5 and collector 6 are internally provided with respective ducts 23, 24, connected to the male elements 22 and to the female elements 22' of the fluid-tight connections, respectively, in order to allow the passage of a thermal conditioning liquid, e.g. water at a predetermined temperature, from the collector 6 to the bottom support and vice versa. The two ducts 24 of the collector 6 allow the water to be conveyed from the external connections 25 to the female elements 22' of the fluid-tight connections and vice versa.

Figure 12:
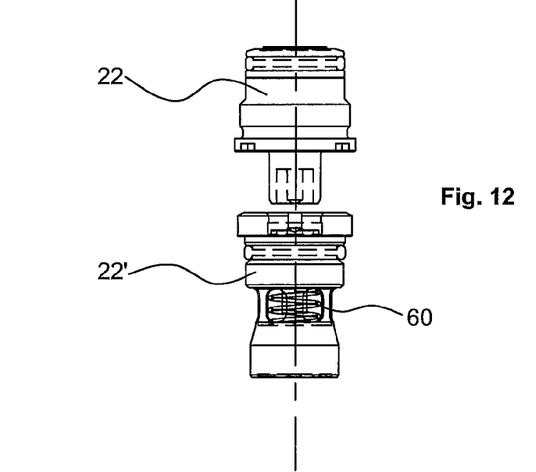
FIG. 12 represents a side view of a third component (push-fit coupling for hydraulic connection) of the blow mould according to the invention.

The hydraulic connection between collector 6 and bottom support 5 is produced, therefore, by means of a pair of push-fit, fluid-tight connections of the male-female type. FIG. 12 shows an example of push-fit, fluid-tight connection, which is commercially available and can be used in the present invention.

Figure 5:
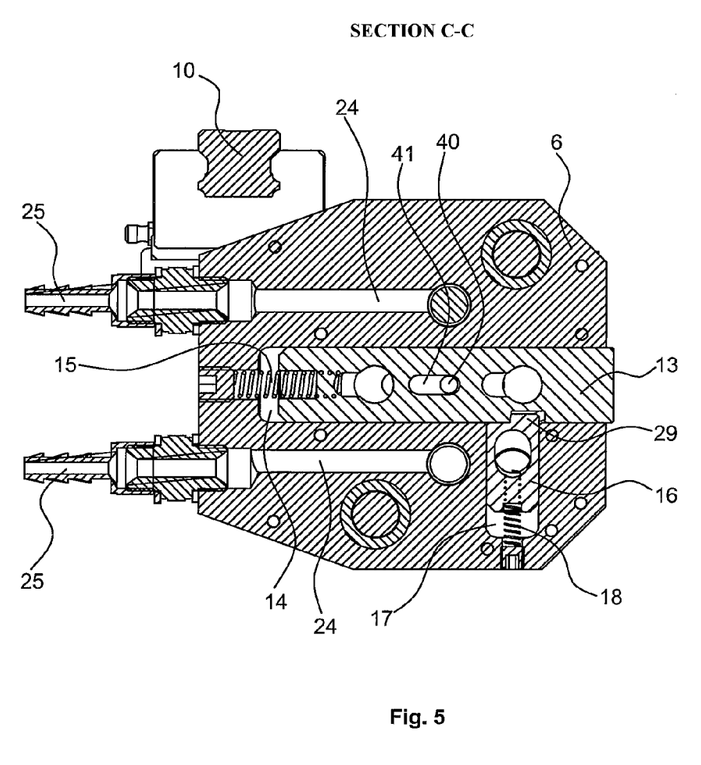

The collector or base plate 6 is further internally provided with:

a first sliding slider 13, arranged partially within the collector;

a first internal housing 14, defining a first axis arranged orthogonally to the longitudinal axis X of the mould, in which first slider 13 can slide, first elastic return means 15, fixed at a first end thereof to a bottom of said first internal housing 14 and at a second end thereof to the first slider 13, to push said first slider 13 towards a position thereof which is more external with respect to the collector (FIG. 9), corresponding to a locking position between collector 6 and support member 5;

a second sliding slider 16, arranged completely within the collector;

a second internal housing 17, defining a second axis transversal to the first axis of first internal housing 14, in which second slider 16 can slide, second elastic return means 18, fixed at a first end thereof to a bottom of said second internal housing 17 and at a second end thereof to the second slider 16, to push the second slider 16 towards a position of mechanical connection to the first slider 13 (FIG. 5).

First and second elastic return means 15, 18 are, preferably but not necessarily, helical compression springs. Other types of springs can alternatively be provided.

The first slider 13, shown in FIG. 11, is advantageously provided with:

a housing 26, provided at the end thereof within the collector 6, for housing an end of the elastic return means 15;

two transversal through-holes 27, arranged along the longitudinal sliding direction of the first slider 13, appropriately shaped to lock the respective first connection pin 20 when the first slider 13 passes from the most internal position thereof with respect to the collector (FIG. 5), corresponding to an unlocking position in which collector 6 and support member 5 are not connected to each other, to said most external position (FIG. 9), corresponding to a locking position in which collector 6 and support member 5 are connected to each other by means of the pins 20;

a lateral recess 28 to accommodate a corresponding protuberance 29 of the second slider 16 and keep the first slider 13 fixed in said most internal position thereof with respect to the collector (FIG. 5);

a longitudinal slot 41, provided between the two holes 27, configured to house a limit stop element 40 integral with the structure of the collector 6, so as to delimit the travel of the first slider.

Advantageously, the first connection pins 20 have a substantially mushroom- or cap-shaped end and the respective holes 27 of the first slider 13 have an eyelet-shaped profile for a quick and efficient mechanical coupling of said pins 20.

Figure 11A:
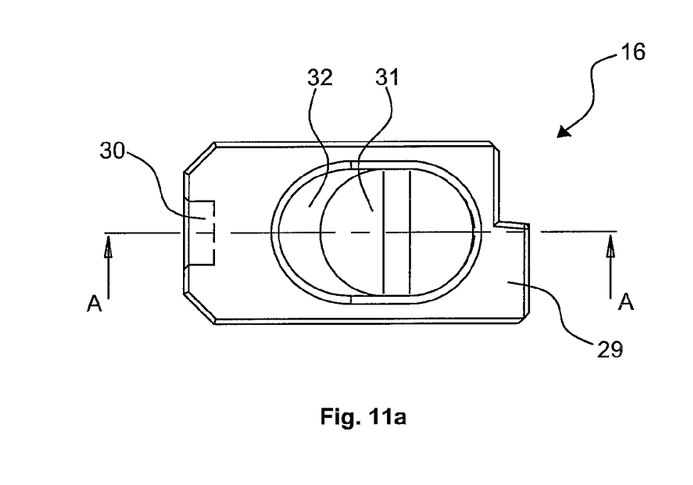
FIGS. 11a-11c represent views of a second component (second slider) of the blow mould according to the invention.
Figure 11B:
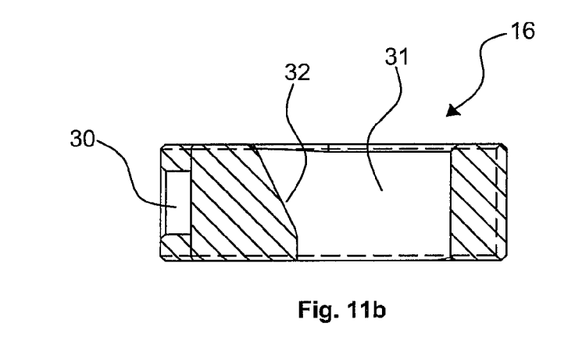
Figure 11C:
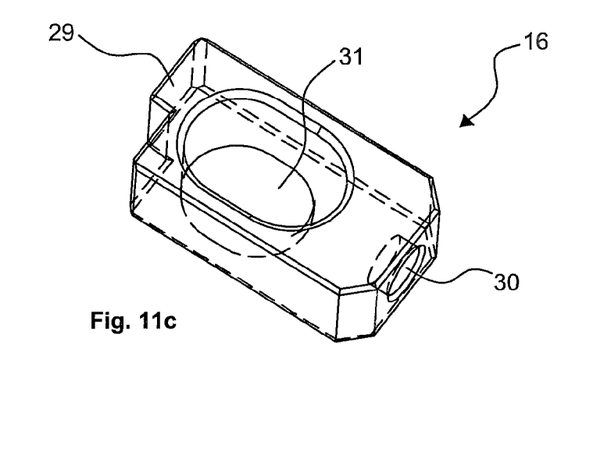

More generally, the first connection pins 20 (FIG. 2b) have an end having a first, more internal, portion 50 having a first diameter, and a second, more external, portion 51, having a second diameter which is larger than the first diameter. The respective holes 27 of the first slider 13 have a first portion 52 having, in top plan, a first profile and a second portion 53 having, in top plan, a second profile which is narrower than the first profile (FIG. 11a).

During the quick mechanical coupling step, the connection pins 20 pass through the respective holes 27 at the portion 52 having a wider profile. After sliding of the first slider 13 outwards from the collector 6, the pins 20 are again locked with the second portion 51 thereof in the portion 53 of the holes 27 having a narrower profile.

The second slider 16, shown in FIG. 10, is advantageously provided with:

a housing 30, provided at the end thereof which is distal with respect to the first slider 13, for housing an end of the elastic return means 18;

a through-hole 31, arranged in a median area of the second slider 16, in which a portion of the internal surface 32 thereof is suitably inclined so that tapered pin 21 engages said portion of inclined surface 32 during the step of connecting support member 5 and collector 6, thus generating the release of the second slider 16 from the first slider 13 and compressing the elastic return means 18;

the aforementioned protuberance 29, provided at the end thereof which is proximal to the first slider 13, to provide the mechanical connection with the lateral recess 28 of the first slider 13 and keep the latter fixed in the position thereof most internal with respect to the collector (FIG. 5).

In the event that a single first connection pin 20 is provided on the flat surface 11 of the bottom support (variant not shown), and therefore a single first through-hole 20' on the flat surface 12 of the collector and a single transversal through-hole 27 in the first slider 13, the tapered pin 21 also functions as an anti-rotation device between bottom support and collector.

The operation of quick coupling the support member or bottom support 5 to the collector or base plate 6 of the blow mould is hereinafter described. Said quick coupling operation provides the following steps:

providing the first slider 13 locked in the position thereof which is most internal with respect to collector 6 (FIG. 5), the first return spring 15 being compressed and the second return spring 18 being stretched which keeps the protuberance 29 of the second slider 16 inserted in the lateral recess 28 of the first slider 13;

lowering support member 5 onto collector 6 so as to automatically engage the connection pins 20, the tapered pin 21 and the male elements 22 of the hydraulic connections in the holes 27 of the first slider, in the hole 31 of the second slider and in the female elements 22' of the hydraulic connections, respectively.

In particular, by lowering support member 5 onto collector 6, the tapered pin 21 engages the portion of the inclined surface 32 of the hole 31 of the second slider 16. The tapered pin 21 therefore pushes the second slider 16 towards the return spring 18, compressing the latter, releasing the protuberance 29 from the recess 28.

The first slider 13, being no longer secured to the second slider 16, moves by action of the return spring 15 outwards from the collector 6 reaching the most external position thereof (FIG. 9), corresponding to a locking position in which collector 6 and support member 5 are connected to each other by means of the pins 20.

Indeed, during the movement of first slider 13 from the most internal position thereof to the most external position thereof with respect to the collector, the pins 20 are inserted in the eyelet-shaped profile of the holes 27 determining the mechanical coupling of support member 5 to collector 6.

Figure 7:
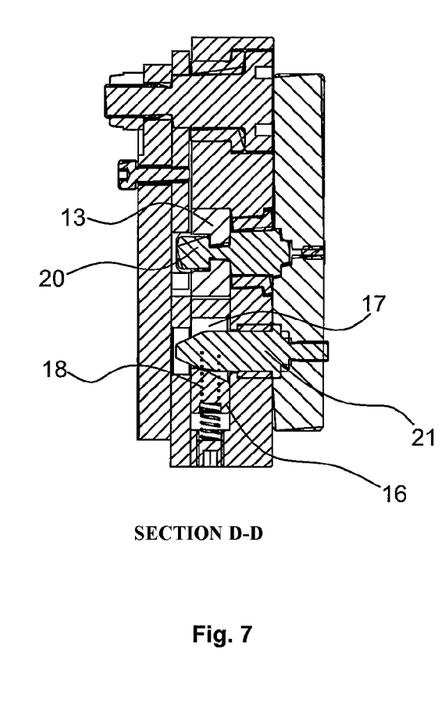
FIG. 7 represents a section view of part of the components in FIG. 6c along the plane D-D.
Figure 8:
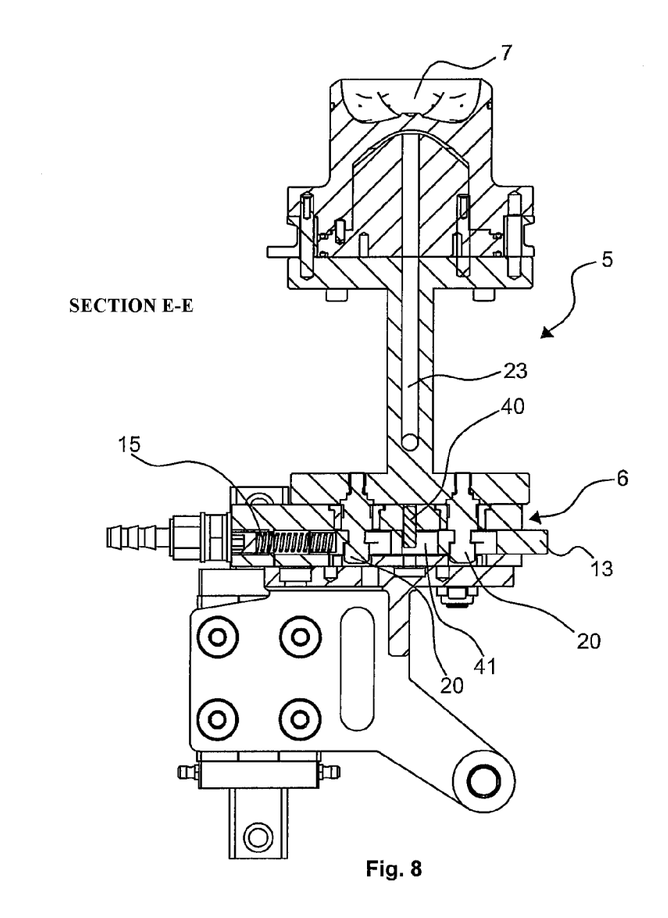
FIG. 8 represents a section view of the components in FIG. 6c along the plane E-E.
Figure 9:
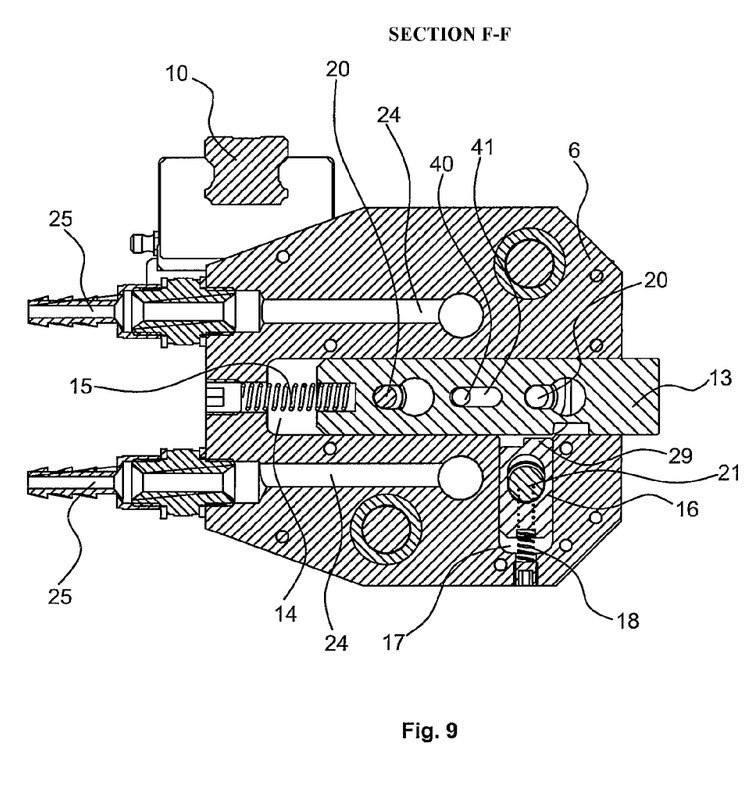
Figure 10A:
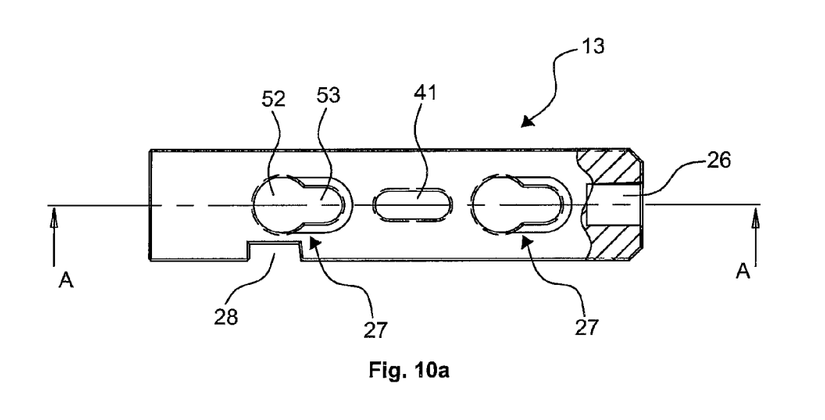
FIGS. 10a-10c represent views of a first component (first slider) of the blow mould according to the invention.
Figure 10B:
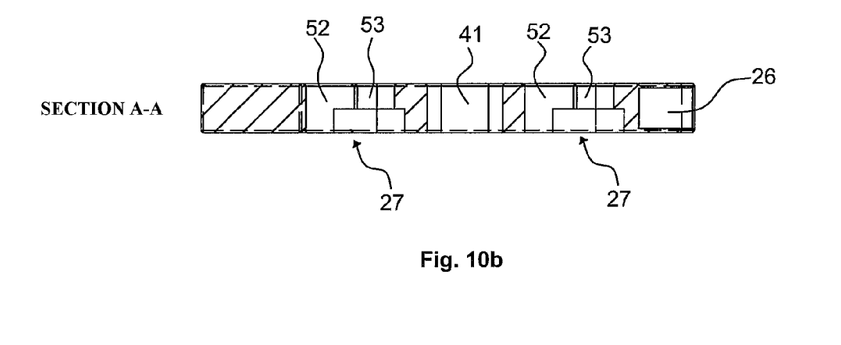
Figure 10C:
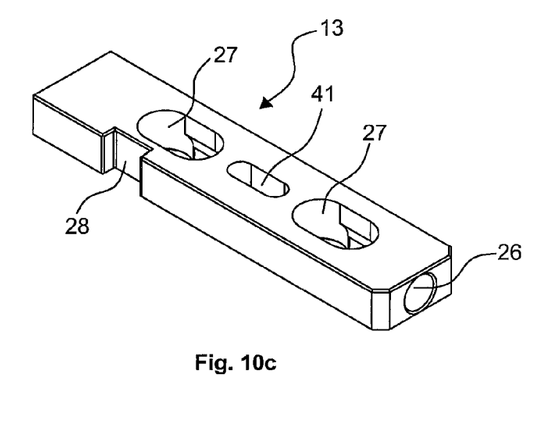

The pins 20 are in a locking position with the first slider 13 at the end of the vertical engagement movement of the bottom support onto the collector (FIGS. 7, 8 and 9). The travel of the first slider 13 outwards from the collector is delimited by a limit stop pin 40, integral with the structure of the collector 6, inserted into the longitudinal slot 41 provided in the first slider 13 between the two holes 27 (see FIGS. 4, 5 and FIGS. 8, 9). Said travel can be, for example, around 10 mm.

Advantageously, the portion of inclined surface 32 of the hole 31 allows the first slider 13 to be released with less force with respect to the bias force exerted by the return spring 15. The portion of inclined surface 32 has an angle of inclination of around 20-30°, preferably 25°, with respect to the vertical direction of advancement of the tapered pin 21.

With the automatic positioning of the first slider 13 in the most external configuration thereof, the manual operations for quick coupling the bottom support to the mould base are concluded.

Advantageously, to carry out the inverse operation of automatically releasing support member 5 from collector 6 it is sufficient to:
- manually push the first slider 13 towards the inside of the collector 6 until the former is locked in the most internal position thereof (FIG. 5),
- and, at the same time, manually facilitate the upward return movement of support member 5.

Pushing the first slider 13 towards the inside of the collector during the uncoupling operation, the pins 20 tend to come out of the eyelet-shaped profile of the holes 17. At the same time, the reaction springs 60 (FIG. 12), present within the hydraulic connections, push the support member 5 upwards, releasing the tapered pin 21 from the portion of inclined surface 32 of the hole 31 and allowing the second slider 16, thanks to the action of the return spring 18, to engage the first slider 13, locking the latter in the rearward position thereof (FIG. 5). At this point, the first return spring 15 is compressed and the second return spring 18 is stretched, keeping the protuberance 29 of the second slider 16 inserted in the lateral recess 28 of the first slider 13.

The invention claimed is:

1. A blow mould for plastic containers, defining a longitudinal axis, comprising at least two lateral half-moulds and a base of the mould, wherein the base of the mould comprises a first member and a second member connectable to each other by means of a quick coupling system comprising at least a first connection pin, between said first member and second member, said at least one first connection pin being fixed to said first member, wherein said second member includes therein
a first slider, defining a first longitudinal sliding direction, sliding along said first direction on an orthogonal plane with respect to said longitudinal axis and capable of taking an unlocking position and a locking position, said first slider being provided with at least one hole to lock said at least one first connection pin therein when the first slider is in the locking position,
and a second slider defining a second longitudinal sliding direction on said plane, intersecting said first sliding direction; said second slider being slidable along said second sliding direction from a first position of mechanical connection with the first slider, wherein the first slider is in the unlocking position, to a second position of releasing from said first slider, wherein the first member and the second member are connected to each other by means of said at least one first connection pin and the first slider is in the blocking position.

2. The blow mould according to claim 1, wherein the first member is provided with two first connection pins and the first slider is provided with two holes arranged along said first longitudinal sliding direction, each hole being appropriately shaped to lock a respective first connection pin when said first slider moves from the unlocking position to the locking position.

3. The blow mould according to claim 1, wherein the first member is provided with a second connection pin between the first member and the second member, adapted to interact with the second slider thus taking it from said first position of mechanical connection to said second releasing position.

4. The blow mould according to claim 3, wherein in the second member there are provided:
a first internal longitudinal housing in which the first slider is able to slide,
first elastic return means, fixed at a first end to a bottom of said first internal housing and at a second end to the first slider, to push the first slider towards said locking position,
a second internal longitudinal housing in which the second slider is able to slide,
second elastic return means, fixed at a first end to a bottom of said second internal housing and at a second end to the second slider, to push the second slider towards said first position of mechanical connection.

5. The blow mould according to claim 3, wherein at least one quick coupling, fluid-tight connection is provided between the first member and the second member for passing a thermal conditioning liquid from the second member to the first member and vice versa.

6. The blow mould according to claim 5, wherein said at least one fluid-tight connection comprises a male element protruding from the first member and a female element engaged with the second member or vice versa.

7. The blow mould according to claim 5, wherein two fluid-tight connections are provided.

8. The blow mould according to claim 4, wherein at least a first through hole is provided on a surface of the second member for passing said at least one first connection pin into the first internal housing.

9. The blow mould according to claim 8, wherein a second through hole is provided on a surface of the second member for passing said second connection pin into the second internal housing.

10. The blow mould according to claim 2, wherein said first connection pins have one end provided with a first portion having a first diameter and a second portion having a second diameter which is larger than the first diameter, and the respective holes of the first slider have an eyelet-shaped profile to hook said first connection pins.

11. The blow mould according to claim 3, wherein said second connection pin is a tapered pin and said second slider is provided with a respective through hole having a portion of internal surface inclined so that the tapered pin engages said portion of internal surface, during the step of connecting the first member and the second member, thus generating the release of the second slider from the first slider.

\* \* \* \* \*